(12) United States Patent
Andreasen

(10) Patent No.: US 10,030,853 B2
(45) Date of Patent: Jul. 24, 2018

(54) LED SCREEN COMPRISING SPRING RETAINERS FOR LED MODULES

(71) Applicant: Martin Professional ApS, Arhus (DK)

(72) Inventor: Jesper Thaagaard Andreasen, Sabro (DK)

(73) Assignee: MARTIN PROFESSIONAL APS., Aarhus (DK)

( * ) Notice: Subject to any disclaimer, the term of this patent is extended or adjusted under 35 U.S.C. 154(b) by 292 days.

(21) Appl. No.: 14/733,832

(22) Filed: Jun. 8, 2015

(65) Prior Publication Data

US 2015/0362160 A1    Dec. 17, 2015

(30) Foreign Application Priority Data

Jun. 13, 2014  (DK) .................. 2014 70356

(51) Int. Cl.
| | | |
|---|---|---|
| *G09F 13/04* | (2006.01) | |
| *G09F 13/08* | (2006.01) | |
| *B25G 3/18* | (2006.01) | |
| *F16B 21/00* | (2006.01) | |
| *F16D 1/00* | (2006.01) | |
| *F21V 19/00* | (2006.01) | |

(Continued)

(52) U.S. Cl.
CPC .............. *F21V 19/004* (2013.01); *F21K 9/20* (2016.08); *F21V 23/06* (2013.01); *G06F 3/1446* (2013.01); *G09F 9/3026* (2013.01); *G09F 9/33* (2013.01); *G09G 2300/026* (2013.01)

(58) Field of Classification Search
CPC ........ F21V 17/20; F21V 19/004; F21V 23/06; G09F 9/3026; G09F 9/33; G06F 3/1446; G09G 2300/0926; F21K 9/20

USPC .................. 403/353, 324, 325, 326
See application file for complete search history.

(56) References Cited

U.S. PATENT DOCUMENTS

| | | | | |
|---|---|---|---|---|
| 3,469,872 A | * | 9/1969 | Damm ..................... | B64D 1/04 24/645 |
| 4,643,610 A | * | 2/1987 | Bien ..................... | F16B 37/043 403/326 |

(Continued)

FOREIGN PATENT DOCUMENTS

WO    2012172493 A1    12/2012

OTHER PUBLICATIONS

European Search Report for Application No. 15 17 1569 dated Jan. 18, 2016.

(Continued)

*Primary Examiner* — Erin Kryukova
(74) *Attorney, Agent, or Firm* — Artegis Law Group, LLP

(57) ABSTRACT

Embodiments relate to a light emitting diode (LED) screen that includes a mounting frame; a plurality of LED modules arranged at said mounting frame, said LED modules comprises a plurality of LED pixels arranged in an array, and a plurality of retention systems configured to securing at least one of said LED module to said mounting frame. At least one of said retention systems comprises a male part, a female part adapted to receive said male part and a retention spring, said retention spring is movable between a retaining position and a non-retaining position, where, in said retaining position, said retention spring is configured to engage said male part and to provide a retaining force to said male part, said retaining force presses said mounting frame and said LED module together.

8 Claims, 7 Drawing Sheets

(51) Int. Cl.
*F21V 23/06* (2006.01)
*G06F 3/14* (2006.01)
*G09F 9/302* (2006.01)
*G09F 9/33* (2006.01)
*F21K 9/20* (2016.01)

(56) References Cited

U.S. PATENT DOCUMENTS

| 6,854,946 B2* | 2/2005 | Bauer | F16B 21/09 |
| | | | 411/523 |
| 2009/0309819 A1* | 12/2009 | Elliott | G06F 3/1446 |
| | | | 345/82 |
| 2012/0062540 A1* | 3/2012 | Quadri | G09F 9/3026 |
| | | | 345/211 |

OTHER PUBLICATIONS

Danish Search Report for Application No. PA201470356 dated Jan. 7, 2015.

* cited by examiner

LED SCREEN COMPRISING SPRING RETAINERS FOR LED MODULES

CROSS-REFERENCE TO RELATED APPLICATIONS

The present application claims priority to Denmark patent application titled, "LED SCREEN COMPRISING SPRING RETAINERS FOR LED MODULES," filed on Jun. 13, 2014 and having Application No. PA201470356. The subject matter of this related application is hereby incorporated herein by reference.

TECHNICAL FIELD

The present invention relates to a LED screen comprising a mounting frame where on a plurality of LED modules are removable arranged. The LED Modules comprises a plurality of LED pixels.

BACKGROUND

LED pixel devices where a number of LED pixels are used to create dynamic graphical elements is widely known and used in the field of visual solutions. For instance the LED pixel devices can be used to generate dynamic graphics elements in connection with architectural installations or as a part of a stage in connection with an entertainment event. Typically each LED pixel comprises a number of red LEDs, a number of blue LEDs and a number of green LEDs which can be dimmed in relation to each other whereby a large number of colors can be created by each LED pixel as known in the art of additive color mixing and LED video display systems. Presently there exists a number of different types of products which can be used to create dynamic graphical elements ranging from simple LED pixel devices with few LED pixels (typical 5-10 pixels) to high resolution LED pixel screens with a large number of LED pixels (+1000 pixels) arranged in flat rectangular array. Flexible LED pixel devices, where the LED pixels are provide as a flexible structure for instance a flexible LED pixel string do also exist. For instance the LED device can be a LED screen comprising a mounting frame where on a plurality of LED modules are removable arranged and where the LED modules comprises a plurality of LED pixels. Such LED screens make it possible to exchange LED modules individual for instance in case of malfunctioning or to provide different LED pixel spacing (pitch) of different parts of the LED screen. The LED module must be arranged very accurately at the mounting frame as an incorrect arranged LED module is easily detected by a person and the esthetical look of the LED screen is thus destroyed. Therefore the LED modules are mounted at the factory using screw or other fastening mechanism. When an LED module must be replace a technician need to unscrew and remove the existing LED module and thereafter arrange a new LED module and fastening the new LED module using the screws. This is very difficult and time consuming as such replacement typical is performed when the LED screen have be mounted in its position during the light show and the technician must thus in many cases change the LED module high above the ground with the risk of dropping the LED module and the screws. In addition in systems using screws there is a risk that the screws are tighten too much resulting in deformation of the LED modules which destroys the look of the LED screen and reduces the life time of the LED module. The screws must thus be mounted with correct momentum which for instance in replacement situations typical it not performed. As a consequence there is a need for a fastening mechanism enabling fast and accurate arrangement of LED modules at the mounting frame of the LED screen.

US 2009/0309819 discloses a video display where multiple display modules are assembled into a plurality of tiles. In a specific implementation, tiles connect to adjacent tiles through attachment mechanisms such as latches, clips, clamps, mounts, rotary-lock mounts (e.g., NCC rotary-lock mount), or any other types of fastener which provide accurate and improved alignment without having any requirement (or minimal requirements) to provide support or strength to the system.

SUMMARY

The object of the present invention is to solve the above described limitations related to prior art. This is achieved by a LED screen as described by the independent claim and the dependent claims describe possible embodiments of the present invention. The advantages and benefits of the present invention are described in the detailed description of the invention.

DESCRIPTIONS OF THE DRAWINGS

DETAILED DESCRIPTION

The figures serve to illustrate the principles and different aspects of the present invention and the skilled person realizes that the present invention can be carried out in many embodiments varying from those shown in the figures.

Figure 1A:
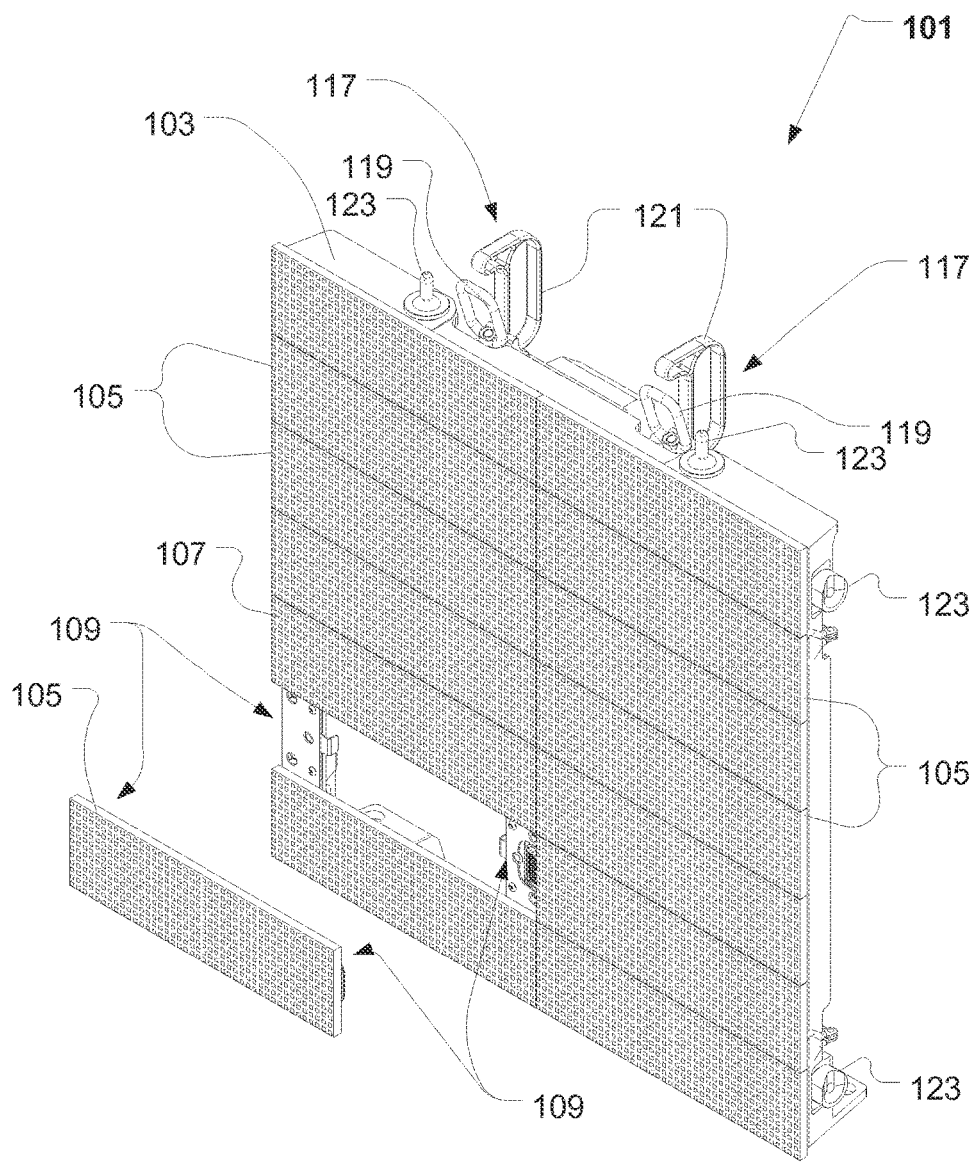
FIG. 1a-1c illustrate a LED screen according to the present invention.
Figure 1B:
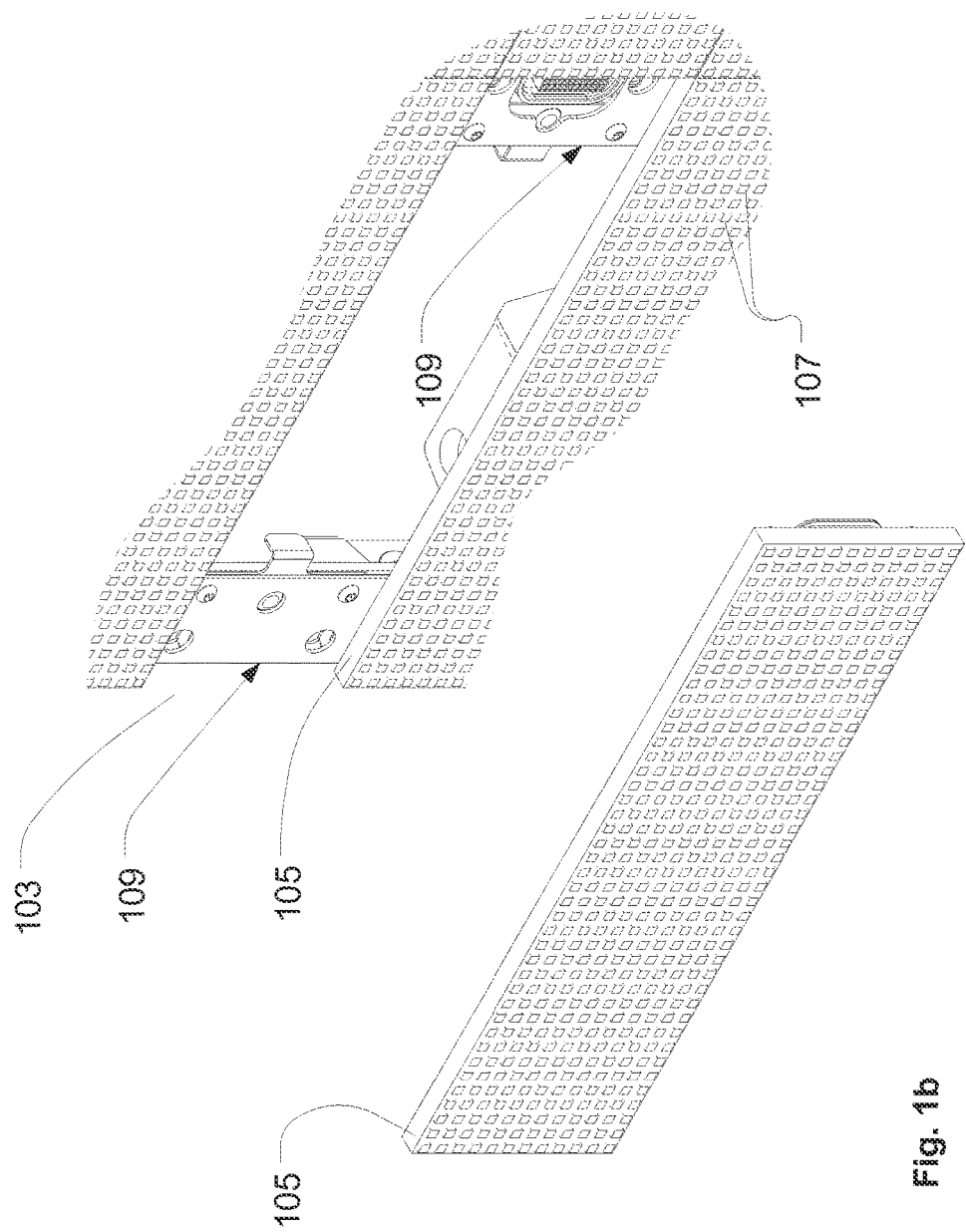
Figure 1C:
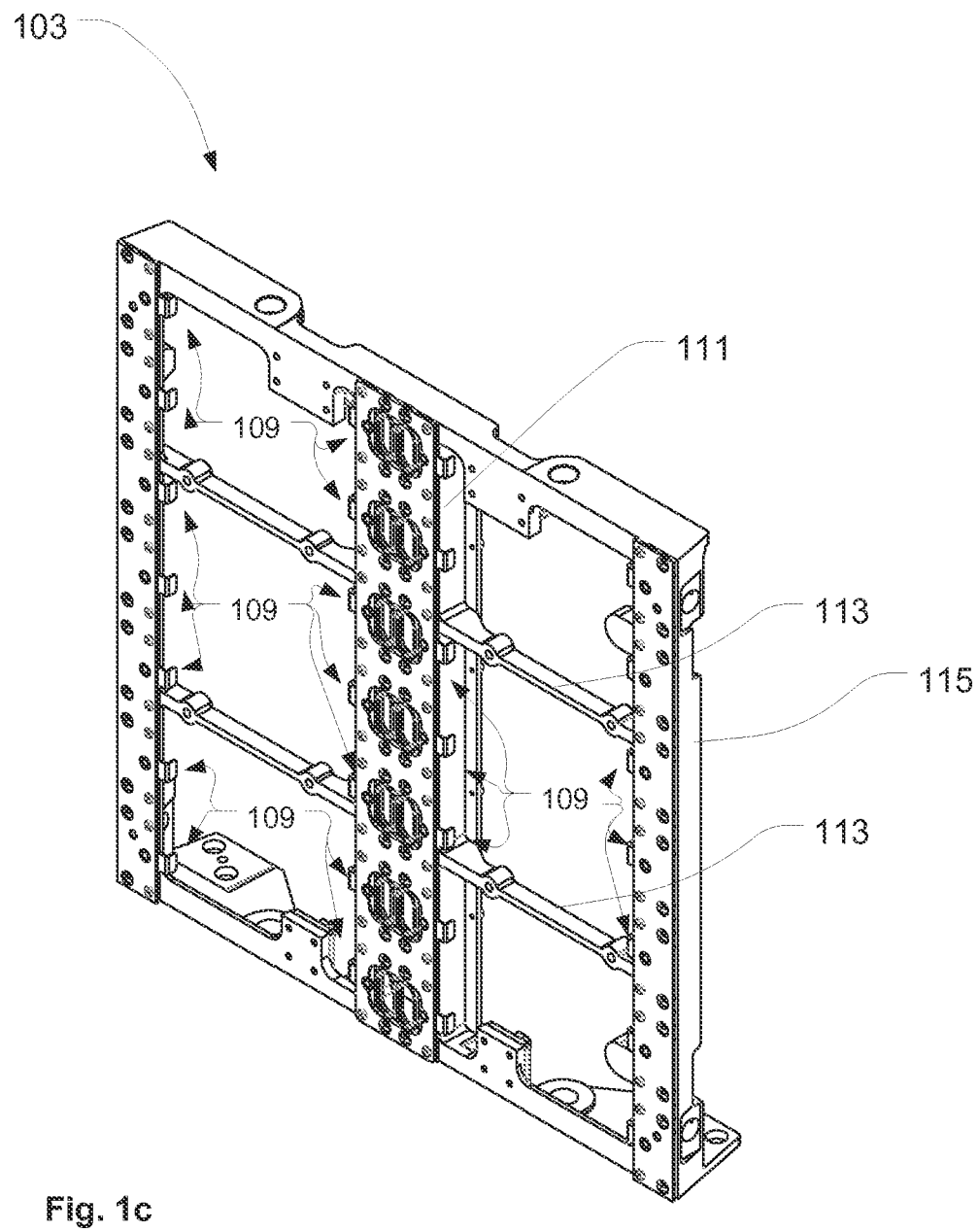

FIG. 1a-1c illustrate a LED screen according to the present invention, where FIG. 1a illustrates a front perspective view with one LED module dismounted from the mounting frame, FIG. 1b illustrates an enlarged view of the dismounted LED module and the LED screen; and FIG. 1c illustrates the mounting without LED modules.

The LED screen 101 comprises a mounting frame 103 and a plurality of LED modules 105 arranged at the mounting frame. The mounting frame acts as a supporting structure carrying the LED modules and comprises electronics for control (not shown) of the LED modules.

The LED modules comprises a plurality of LED pixels 107 arranged in an array and the LED pixel comprises a number of LEDs, which can be turned on and off and/or dimmed in order to adjust the visual appearance of the pixel. In some embodiments the LED pixel comprises a number of red LEDs, a number of blue LEDs and a number of green LEDs which can be dimmed in relation to each other, whereby a large number of colors can be created by each LED pixel. The LEDs can be any kind of LEDs such a solid state emitters, polymer LED and/or organic LEDs. The LED screen and LED pixels can be controlled as known in the art of LED screens for instance as known for the EC-20 and EC-10 LED screens provided by the applicant Martin Professional Aps.

In the illustrated embodiment the mounting frame 103 is embodied as a rectangular frame structure comprising a central spline 111 and a number of ribs 113 connecting the central spline with the sides 115 of the rectangular frame structure. The electronics for LED control are arranged at the central spline 115. Further the mounting frame 103 comprises mechanical connectors 117 enabling the mounting frame to be connected to other LED screens in order to form huge LED screen comprising a plurality of LED screens. The mechanical connectors comprise engagements nooses 119 arrange at the top of the mounting frame and which can engage corresponding hooks (not shown) at the bottom part of a similar mounting frame arrange above the mounting frame. The engagement nooses can be locked and released using locking handles 121, which also are adapted to engage to bottom part for the LED screen arranged above. The mounting frame comprises also engagement hooks (not visible) at the bottom part of the mounting frame enabling a similar mounting frame to be attached to the bottom. Additionally the mounting frame comprises mechanical guides 123 adapted to fit into corresponding guiding holes at the neighboring mounting frames. The LED screen comprises a plurality of retention systems 109 configured to securing at least one of the LED modules to the mounting frame.

Figure 2A:
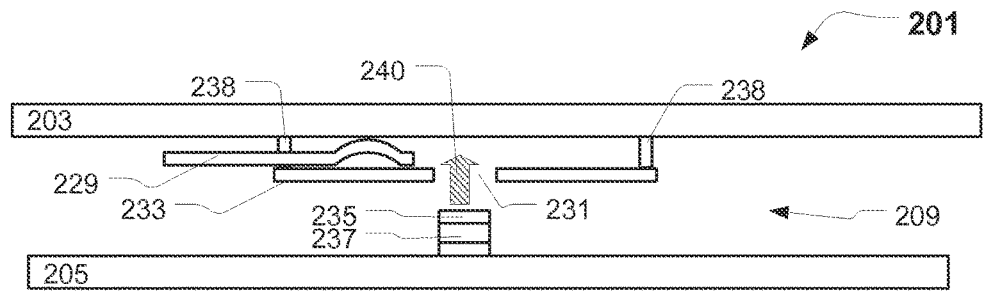
FIG. 2a-2d illustrate a simplifies embodiment of the retention system of the LED screen according to the present invention.
Figure 2B:
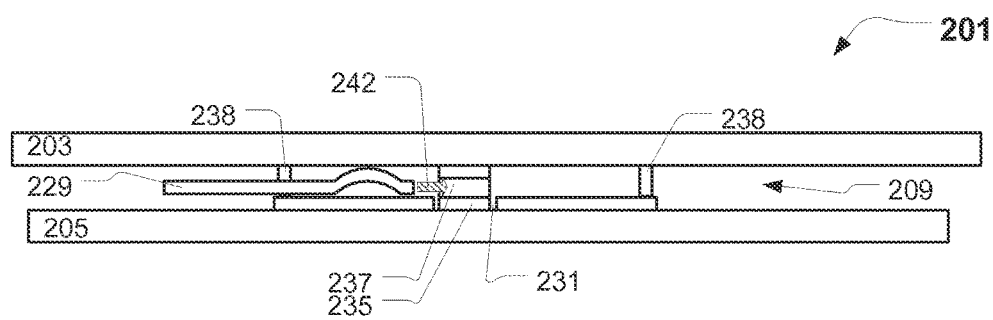
Figure 2C:
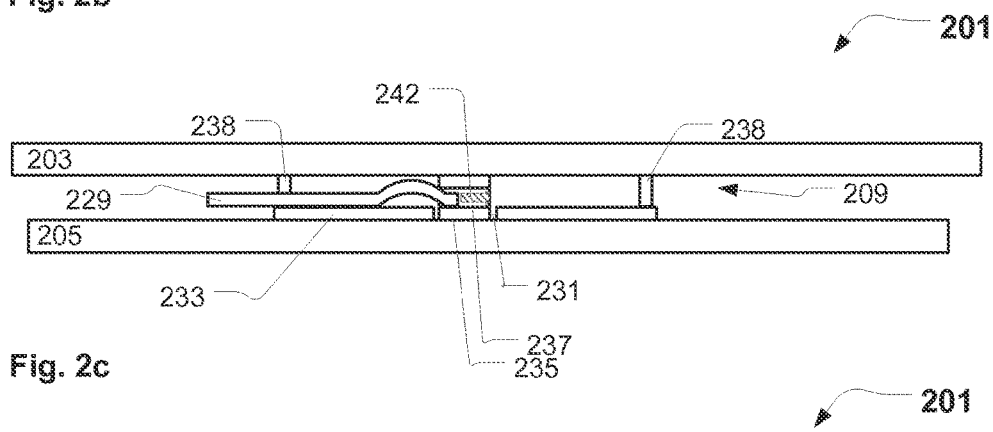
Figure 2D:
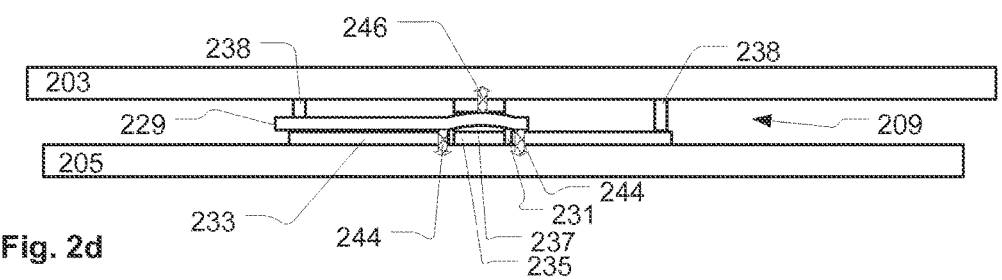

Facing FIG. 2a-2d illustrate a simplified embodiment of a LED screen 201 according to the present invention and serve to illustrate the principles of the present invention. FIG. 2a-2d illustrate a cross-sectional view the simplified embodiment where FIG. 2a illustrate the LED screen prior to arranging the LED module at the mounting frame, 2b and 2c illustrated intermediate situations when arranging the LED module at the LED screen and FIG. 2d illustrates the LED screen with the LED module arranged at the mounting frame.

The LED screen 201 comprises a mounting frame 203, a LED module 205 arranged at the mounting frame and at least one retention system 209 configured to securing at the LED modules to the mounting frame. The retention system 209 comprises a male part, a female part adapted to receive the male part and a retention spring 229.

The retention spring 229 is movable between a retaining position (shown in FIGS. 2a and 2b) and a non-retaining position (shown in FIG. 2d). In the retaining position the retention spring is configured to engage the male part and providing a retaining force to the male part. The retaining force presses the mounting frame and the LED module together. This set up makes it possible to attach and detach the LED modules without the use of tools as the retaining spring 229 can be moved manually between the retaining position at the non-retaining position without the use of tooled. This can be achieved as the retaining spring can be moved by hand. Additionally the retention system ensures that the LED modules are securely arranged at the mounting frame as the retaining spring ensures correct pressing force. The pressing force can be defined by designing the shape of the retaining spring and choosing material of the retaining spring accordantly. For instance in one embodiment the retaining spring is embodied in resilient metal. The risk that the LED modules deform during the mounting process can also be reduced as the pressing force can be designed such the deformation due to over tensioning (known from prior art when securing the LED modules using screws) of the LED module is avoided. LED modules can thus be arranged at the mounting frame without using screws.

In the simplified embodiment the female part forms a part of the mounting frame 203 and the male part forms a part of the LED module 205. However it is noticed that the LED screen alternatively may be embodied with the female part at the LED module and with the male part at the mounting frame.

In the simplified embodiment the female part is formed as a retention hole 231 formed in a retention plate 233 and the male part comprises a retention pin 235 configured to fit into the retention hole. The retention pin has at least one furrow 237 formed therein and the retention spring 229 is configured to fit into the furrow and in the retaining position to provide the retention force between the retention pin and the retention plate. The retention plate is secured to and spaced from the mounting plate using a number of spacers 238. The retention spring 229 is arranged between the retention plate and the mounting plate.

Upon mounting the LED module 205 at the mounting frame 203 the retention pin 235 is inserted into the retention hole 231 of the retention plate 233 as illustrated by arrow 240 in FIG. 2a. The retention spring 229 is then manually forced into the furrow 237 of the retention pin 235 as illustrated by arrow 242 in FIGS. 2b and 2c. The retention spring is when moved into the furrow 237 forced into a tension state due the mutual dimensions of the retention spring and the furrow. The tension state of the retention spring is illustrated in FIG. 2d by the fact that the retention spring is deformed. Due the resilient properties of the retention spring the retention spring tries to get back the neutral state and as a consequence a retention force is created between the retention pin and the retention plate. The retention force is created as the part of the retention spring which is in contact with the retention plate pushed the retention part towards the LED module as illustrate by arrows 244 and the part of the retention spring in contact with the retention pin pushes the retention pin (and thereby the LED module) in the opposite direction as illustrated by arrow 246. The results is the fact that a retention force pressing the mounting frame and the LED module together is created.

Figures 3A, 3B:
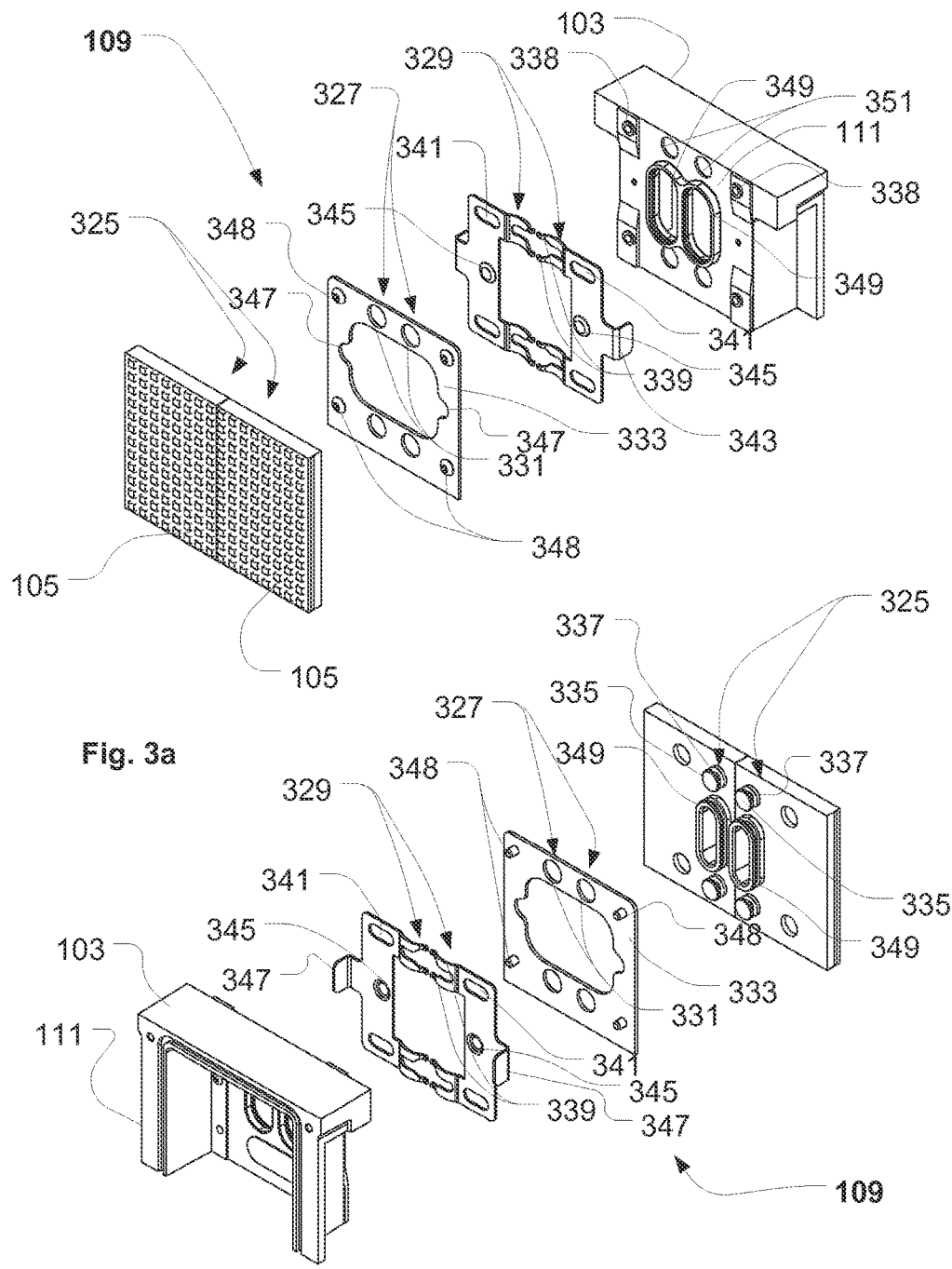
FIG. 3a-3g illustrate an enlarge views of the retention system at the LED screen illustrated in FIG. 1a-1c
Figure 3C:
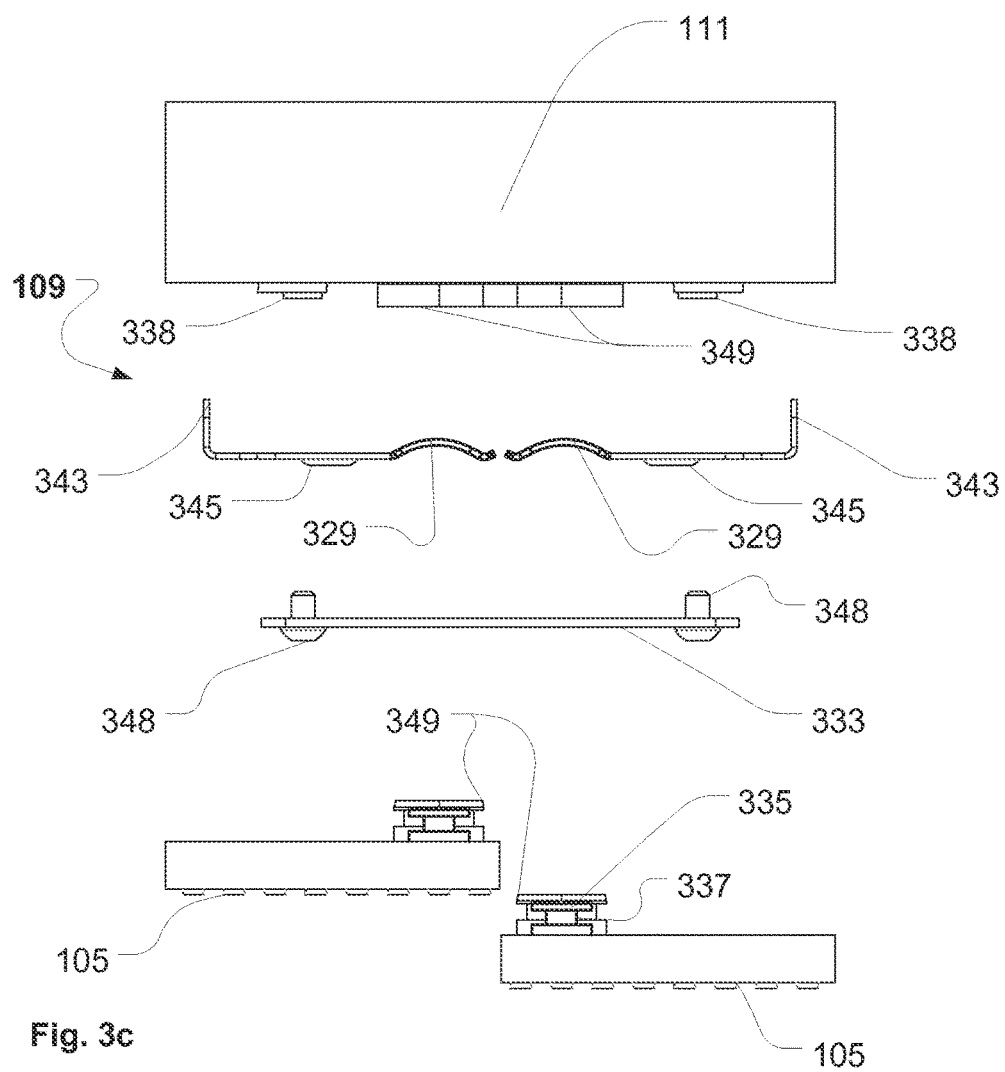
Figure 3D:
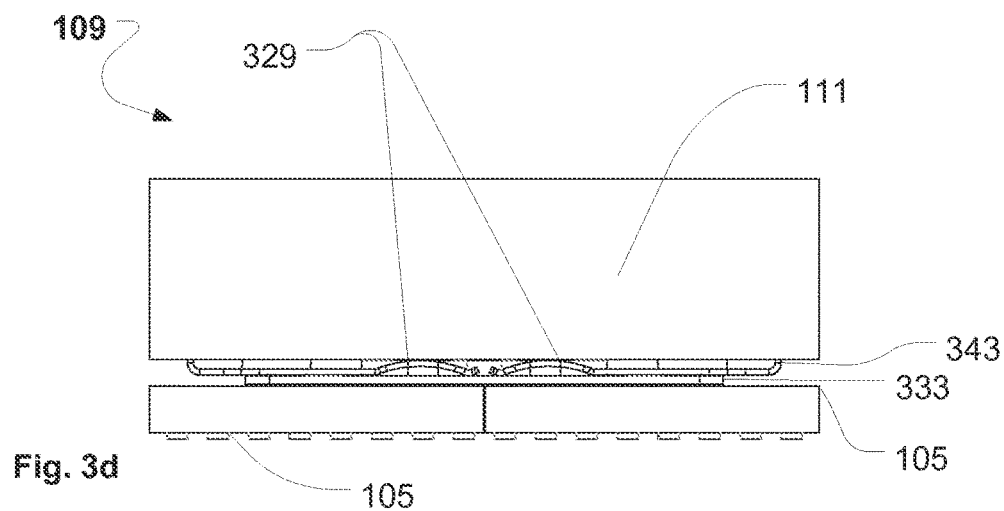
Figure 3E:
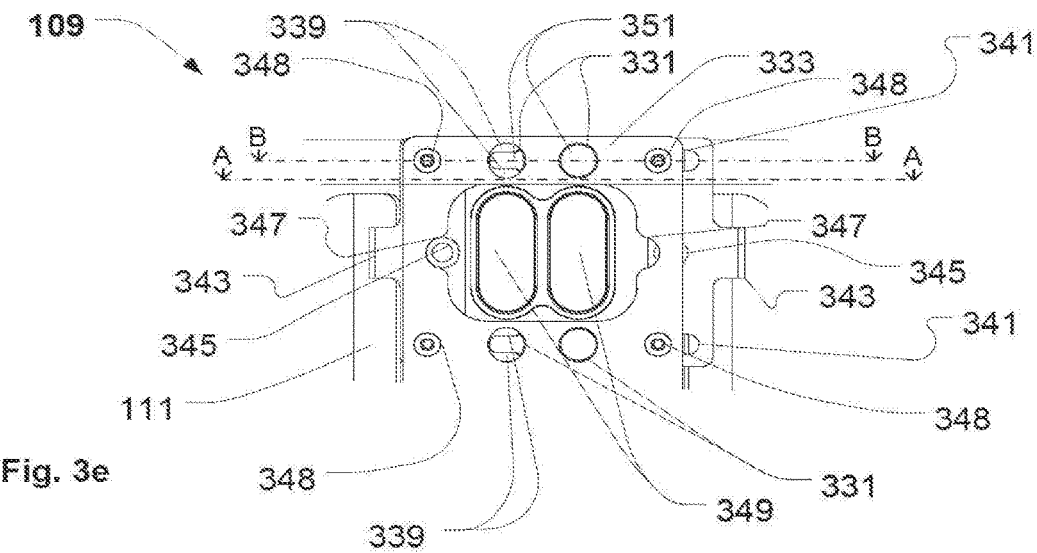
Figure 3F:
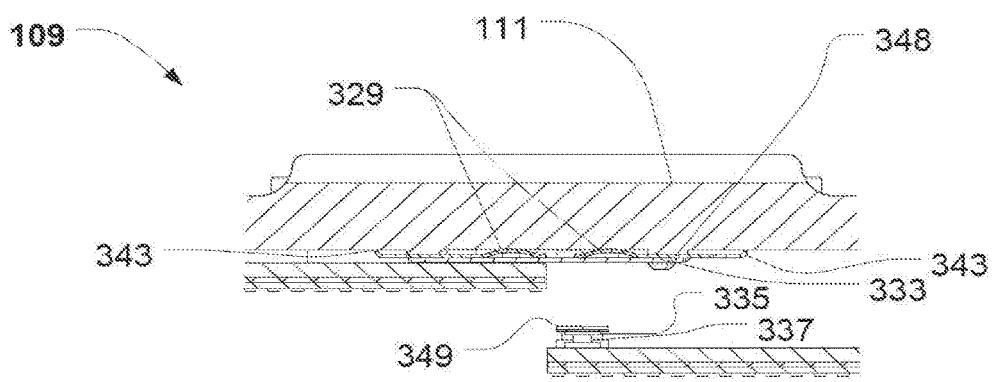
Figure 3G:
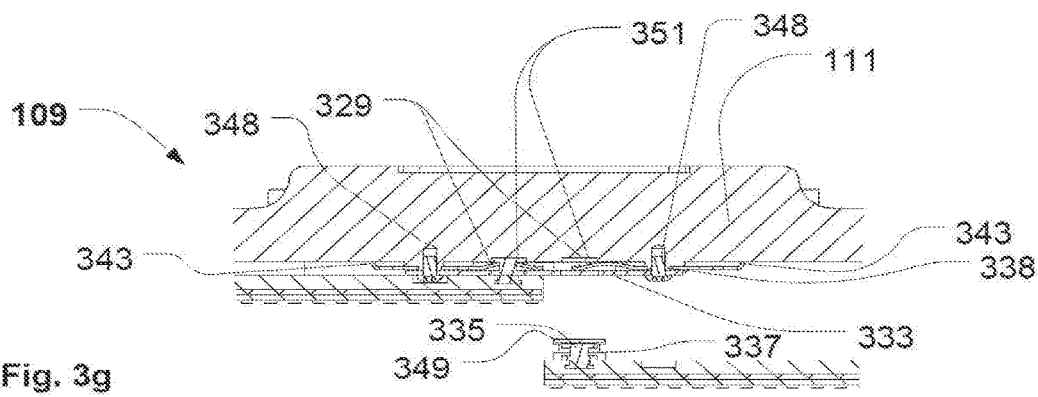

Facing now to FIG. 3a-3e. FIG. 3a-3e illustrate different views of two retention systems 109 of the LED screen 101 illustrated in FIG. 1a-1c and similar features are labeled with the same reference numbers and will not be described in further detail. The illustrated retention systems secure respectively a left and a right LED module 105 to the center spline 111 of the mounting frame 103. FIG. 3a is a front exploded view; FIG. 3b is a back exploded view, FIG. 3c is a top exploded view, FIG. 3c is a top view; FIG. 3d front view with the LED modules removed, FIG. 3e is a cross sectional view through line A-A of FIG. 3d and FIG. 3g is a cross sectional view along line B-B of FIG. 3d.

Each of the retention systems 109 comprises a male part 325, a female part 327 adapted to receive the male part and a retention spring 329. The retention spring 329 is movable between a retaining position (shown at the left side of FIGS. 3e, 3f and 3g) and a non-retraining position (shown at the right side of FIGS. 3e, 3f and 3g). In the retaining position the retention spring is configured to engage the male part and providing a retaining force to the mating part. The retaining force presses the mounting frame and the LED module together. This set up makes it possible to attach and detach the LED modules without the use of tools as the retaining spring 329 can be moved manually between the retaining positions at the non-retaining position without the use of tools. This can be achieved as the retaining spring can be moved by hand. Additionally the retention system ensures that the LED modules are securely arranged at the mounting frame as the retaining spring ensures correct pressing force. The pressing force can be defined by designing the shape of the retaining spring and choosing material of the retaining spring accordantly. For instance in this embodiment the retaining spring is formed of resilient metal. The risk that the LED modules deform during the mounting process can also be reduced as the pressing force can be designed such the deformation due to over tensioning (known from prior art when securing the LED modules using screws) of the LED module is avoided. LED modules can thus be arranged at the mounting frame without using screws.

In the illustrated embodiment the female part 327 forms a part of the center spline 111 of the mounting frame 103 and the male part 325 forms a part of the LED module 105. However it is noticed that the LED screen alternatively may be embodied with the female part at the LED module and with the male part at the mounting frame.

In the illustrated embodiment the female part 327 is formed as a retention hole 331 formed in a retention plate 333 and the male part comprises a retention pin 335 configured to fit into the retention hole. The retention pin has at least one furrow 337 formed therein and the retention spring 329 is configured to fit into the furrow and in the retaining position to provide the retaining force between the retention pin and the retention plate in a similar way as described in connection with FIG. 2a-2d. In FIG. 3c the retention pins 335 and the retention springs 329 have been emphasized in thicker lines. Upon mounting the LED module at the mounting frame the retention pin 335 is inserted into the retention hole of the retention plate and the retention spring 329 is manually forced into the furrow of the retention pin a retention force is hereby created between the retention pin and the retention plate causing the retention pin and the retention plate to be pressed together. As a consequence the LED module and the mounting frame are pressed together.

In the illustrated embodiment the retaining spring 326 comprises two resilient retention fingers 339 configured to engage the furrow 337 at opposite sides of the retention pin. The makes it possible to provide a stronger retention force as the two retention fingers each can contribute to the retention force. The retention fingers do also provide support of the retention pin in the transverse direction and distributes the pressing forces more equally around the retention pin which result in a better securing of the LED module.

The retention plate is secured to and spaced from the mounting frame using a number of spacers 338. Any kind of fasteners can be used to secure the spacers and retention plate to the mounting frame, however in the illustrated embodiment screws 348 are used to fasten the retention plate to the mounting frame. The retention plate is thus secured to a base part (in this embodiment formed by the mounting frame) and the retention spring is movable arranged between the retention plate and base part. In the illustrated embodiment the retention spring comprises a moving guides formed as a guiding aperture 341 wherein the spacers are arranged and the retention spring can thus be moved between the retention position and the non-retention position when moved along the guiding aperture. This makes it possible to control the moving path of the retention spring and thereby ensure that the retention spring automatically will engage with the furrow of the retention pin.

In the illustrated embodiment the retaining spring of at two retention systems are interconnected and can be moved simultaneously between the retaining positions and the non-retaining position. This is achieved by providing the two retaining springs as one piece metal plate where the retaining springs protrudes for the metal plate and a separated. As a consequence the two retaining springs will move simultaneously when the metal plate is moved. The metal pate comprises also a handle 343 for manual moving the metal plate and the two retaining springs. In is noticed that any number of retaining springs can be interconnected and thus moved simultaneously. This makes it possible to provide a plurality of retaining systems to the LED module and mounting frame and the user can lock the retaining these retaining systems simultaneously whereby faster mounting is achieved.

In one embodiment the retention spring comprises at least one locking mechanism and the locking mechanism is configured to lock the retention spring in the retention position. This ensures that the retention spring is kept in the retention position and that additional force is need to extract the retention spring from the retention position. In the illustrated embodiment the locking mechanism is embodied as a locking bulge 345 which will lock with a mating locking edge 347 at the retaining plate. In the non-retaining position the locking bulge needs to be pulled under retention plate and additional force is thus need to be provided in order to force the locking bulge below the retention plate. The locking bulge can be forced under the retention plate due to the resilient properties of the retention spring. The force need to move the retention spring out the locked retention position can be designed by designing the dimensions of the locking bulge in relation the resilient properties of the retention spring and retention plate. In the illustrated embodiment the needed force is designed such the retaining spring can be moved manually without the use of tools.

In the illustrated embodiment LED screen the base part of the retention system (formed by the mounting frame) comprises an accommodating hole 351 configured to accommodate the upper part of the retaining pin. This makes it possible to inset the part of the retention pin which is above the furrow into the accommodating hole, whereby the LED module can be arranged close to the mounting frame and a more compact LED screen can thus be provided. In addition the accommodating hold acts a support and guiding mechanism assisting to arrange the LED module in it correct position.

In the illustrated embodiment the LED modules are electronically connected with the mounting frame through an electronic connector 349. (only the outer parts of the electronic connector are shown, the electrical contact are removed for simplicity.) In the illustrated embodiment the electronic connector are arranged proximately the retention systems connection the LED modules to the center spline of the mounting frame. Further at least two retention systems are arranged proximately the electronic connector and at opposite sides of the electronic connector. This ensure that the electronic contacts (not shown) of the electronic connector are brought in to electric contact and maintain the electric connection when the retention spring are moved into the retention position. Providing two retention systems at opposite sides of the electronic connector ensures that an equal pressing force is provided around the electronic connector and ensures that all of the electrical contacts are in electric contact. The electric contacts are used to transmit power en control signals to the LED pixels.

Facing FIG. 1a-1c it can be seen that the LED screen comprises two retention systems configured to secure opposite ends of the LED module to the mounting frame. One retention system secures one end of the LED module to center spine and one retention system secures other end of the LED module to the outer frame part. As a consequence the LED module is firmly secured to the mounting frame.

The illustrated embodiment of the invention only serves to illustrate the principles of the present invention and it is to be understood that many alternative embodiments may be provided by the person skilled in the art. For instance the resilient spring may be provided in many different shapes as long as it in the retaining position provides a pressing force pressing the LED module and the mounting frame together. The retention pin is illustrated as a cylindrical pin where the furrow is providing as a circular groove. However it is noticed that the retention pin can have any shape as long retention spring can engage the furrow. Further it is noticed that the retention spring alternatively can be provided with an engagement furrow and the retention pin can comprise a protruding element configured to engage the engagement furrow of the retention spring. In other words it is possible to reverse the engagement mechanism between the retention spring and the retention pin.

The claimed invention is:

1. A light-emitting diode (LED) screen, comprising:
a mounting frame;
a plurality of LED modules arranged on said mounting frame, each of said LED modules including a plurality of LED pixels arranged in an array; and
a plurality of retention systems configured to secure at least one of said LED module to said mounting frame,
wherein at least one of said retention systems comprises a male part, a female part adapted to receive said male part, and a retention spring, said retention spring being movable between a retaining position and a non-retaining position, wherein, in said retaining position, said retention spring is configured to engage said male part and to provide a retaining force to said male part that presses said mounting frame and said LED module together,
wherein said female part comprises a retention hole in a retention plate, and said male part comprises a retention pin configured to fit into said retention hole, said retention pin having at least one furrow formed therein, and said retention spring is configured to fit into said furrow to provide, in said retaining position, said retaining force between said retention pin and said retention plate,
wherein said retention spring comprises two resilient retention fingers configured to engage said furrow at opposite sides of said retention pin.

2. The LED screen according to claim 1, wherein said retention plate is secured to a base part, and said retention spring is movably arranged between said retention plate and said base part.

3. The LED screen according to claim 2, wherein said base part comprises an accommodating hole configured to accommodate an upper part of said retention pin.

4. The LED screen according to claim 1, wherein said retention spring comprises at least one locking mechanism, said locking mechanism configured to lock said retention spring in said retention position.

5. The LED screen according to claim 1, wherein retention springs of at least two retention systems are interconnected and can be moved simultaneously between respective retaining positions and respective non-retaining positions.

6. The LED screen according to claim 1, wherein at least one LED module is electronically connected to said mounting frame through an electronic connector.

7. The LED screen according to claim 6, wherein at least two retention systems are arranged proximate to said electronic connector and at opposite sides of said electronic connector.

8. The LED screen according to claim 1, wherein at least two of said retention systems are configured to secure opposite ends of at least one LED module to said mounting frame.

* * * * *